US006898007B2

United States Patent
Woo et al.

(10) Patent No.: US 6,898,007 B2
(45) Date of Patent: May 24, 2005

(54) MICROSCOPE FOR INSPECTING SEMICONDUCTOR WAFER

(75) Inventors: Jai Young Woo, Gyeonggi-do (KR); Kyung Dae Kim, Gyeonggi-do (KR); Jin Sung Kim, Gyeonggi-do (KR); Young Goo Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/071,099

(22) Filed: Feb. 11, 2002

(65) Prior Publication Data

US 2002/0131166 A1 Sep. 19, 2002

(30) Foreign Application Priority Data

Mar. 19, 2001  (KR) ........................................ 2001-14093

(51) Int. Cl.⁷ .............................................. G02B 21/26
(52) U.S. Cl. ...................... 359/394; 359/368; 359/391; 359/393
(58) Field of Search ................................ 359/368–397; 414/744–783

(56) References Cited

U.S. PATENT DOCUMENTS

| | | | | |
|---|---|---|---|---|
| 3,826,558 A | * | 7/1974 | Rasberry et al. ............ 359/394 |
| 4,277,133 A | * | 7/1981 | Staehle ........................ 359/380 |
| 4,408,126 A | * | 10/1983 | Tojo et al. ............. 250/442.11 |
| 4,627,009 A | * | 12/1986 | Holmes et al. ............. 700/302 |
| 4,748,335 A | * | 5/1988 | Lindow et al. ......... 250/559.22 |
| 4,938,654 A | * | 7/1990 | Schram ....................... 414/757 |
| 4,948,330 A | * | 8/1990 | Nomura et al. ............. 414/754 |
| 5,153,916 A | * | 10/1992 | Inagaki et al. .............. 382/151 |
| 5,337,178 A | * | 8/1994 | Kung et al. ................. 359/393 |
| 5,739,899 A | * | 4/1998 | Nishi et al. ................... 355/53 |
| 5,841,250 A | * | 11/1998 | Korenage et al. ........... 318/135 |
| 5,852,300 A | * | 12/1998 | An ........................ 250/559.22 |
| 5,864,389 A | * | 1/1999 | Osanai et al. ................ 355/53 |
| 5,955,739 A | * | 9/1999 | Kawashima ................ 250/548 |

FOREIGN PATENT DOCUMENTS

| | | |
|---|---|---|
| DE | 195 49 022 A1 | 7/1995 |
| DE | 195 37 734 A1 | 4/1997 |
| JP | 09186209 | 7/1997 |

* cited by examiner

Primary Examiner—Thong Q Nguyen
(74) Attorney, Agent, or Firm—Volentine, Francos & Whitt, PLLC

(57) ABSTRACT

A microscope for inspecting a semiconductor wafer includes an optical unit including objective lenses and oculars for observing the semiconductor wafer; a display unit for magnifying and displaying an image of the semiconductor wafer observed by the optical unit; a sample piece stage holding the semiconductor wafer; a stage moving unit for moving the semiconductor wafer in an x-axis direction, a y-axis direction or a z-axis direction; a stage rotation unit for rotating the semiconductor wafer in a horizontal direction; a stage tilting unit for tilting the semiconductor wafer; and a controller for controlling operation of the microscope.

21 Claims, 11 Drawing Sheets

MICROSCOPE FOR INSPECTING SEMICONDUCTOR WAFER

CROSS REFERENCES TO RELATED APPLICATIONS

This application claims the benefit under 35 U.S.C. § 119 of Korean Patent Application No. 2001-14093 filed on Mar. 19, 2001 the entirety of which is hereby incorporated by reference for all purposes as if fully set forth herein.

BACKGROUND

1. Field of the Invention

The present invention relates to a microscope for inspecting a semiconductor wafer.

2. Description of Related Art

As a semiconductor device is highly-integrated, layers formed on a semiconductor wafer become diverse, and remaining layers on an edge portion and a portion having a predetermined thickness (hereinafter, referred to as bevel portion) of the semiconductor wafer become more difficult to remove. Such remaining layers on the edge portion and the bevel portion of the semiconductor wafer are transited to a chip portion of the semiconductor wafer during a dry-etching process and a wet-etching process and serve as particles that cause various defects of the semiconductor wafer.

FIG. 1 is a plan view illustrating a typical semiconductor wafer, and FIG. 2 is a cross-sectional view taken along line II—II of FIG. 1. The semiconductor wafer undergoes several processes such as a process for depositing a layer on a surface thereof, a process of patterning the deposited layer, and a process of ion-implanting an impurity. However, these processes are not performed only on a surface of the wafer W. In other words, a layer can be deposited on an edge portion E, a bevel portion B and even a bottom portion L of the semiconductor wafer. The remaining layer on the edge portion E, the bevel portion B and the bottom portion L serves as a source of particles that affects a chip portion C of the semiconductor wafer W and causes various defects such as a contamination of the semiconductor wafer, thereby lowering a manufacturing yield.

In order to overcome the problem, a process of whittling the bevel portion B using an oxide wet-etching technique is added to suppress the defect of the semiconductor wafer. However, this has a problem in that a process is complicated and cannot solve a fundamental level of defects resulting from the edge portion and the bevel portion of the semiconductor wafer.

FIG. 3 shows a process of inspecting a semiconductor wafer using a conventional microscope. In order to inspect defects on the semiconductor wafer, first the semiconductor wafer W having defects resulting from the edge portion E and the bevel portion B thereof is conveyed to an analysis room.

The defective semiconductor wafer W is laid on a sample piece stage 1, and then defective portions and an edge portion E are inspected using a microscope 5. The sample piece stage 1 is configured to perform only a horizontal shift and a vertical shift, i.e., x-axis direction (left and right), y-axis (upper and lower) and z-axis movements (up and down). However, the sample piece stage 1 doesn't have a horizontal rotation function or a vertical rotation function. Therefore, in order to inspect the bevel portion B of the semiconductor wafer W, a piece of the semiconductor wafer W to be inspected is manually cut using a diamond knife 2. The cut piece of the semiconductor wafer W is attached on a wafer holding jig 3 having a predetermined tilt angle using a carbon tape. In other words, in order to inspect the bevel portion B of the semiconductor wafer W, several wafer holding jigs 3 each having a different tilt angle are required.

FIG. 4 is a photograph illustrating the edge portion of the semiconductor wafer, and FIG. 5 is a photograph illustrating the bevel portion of the semiconductor wafer. As shown in FIGS. 4 and 5, defects are found in the edge portion and the bevel portion of the semiconductor wafer W. Such defects are transited to the chip portion C of the semiconductor wafer W and serve as contamination elements that contaminate the chip portion C of the semiconductor wafer W.

The conventional microscope described above has the following disadvantages. First, since the sample piece stage just performs a horizontal shift and a vertical shift, it is impossible to simultaneously inspect the edge portion and the bevel portion of the semiconductor wafer, thereby increasing the wafer inspection time. Second, during handling of a wafer sample piece, such as conveying and cutting a defective semiconductor wafer, other contamination of the wafer sample piece can occur, whereupon the inspection data can have errors. Third, since regular monitoring is not performed during a process of manufacturing the semiconductor wafer, it is difficult to find and prevent defects in advance. Fourth, in order to inspect different tilts of the bevel portion of the semiconductor wafer, many wafer holding jigs each having a different tilt angle are required. Finally, it is difficult to precisely inspect the semiconductor wafer having defects in the edge portion and the bevel portion and to clearly analyze or clarify defect factors, and also the inspection time is long, such that an appropriate remedy cannot be performed.

SUMMARY OF THE INVENTION

To overcome the problems described above, preferred embodiments of the present invention provide a microscope for inspecting a semiconductor wafer that can perform a precise inspection and clearly analyze or clarify defect factors, thereby increasing a manufacturing yield.

It is another object of the present invention to provide a microscope for inspecting a semiconductor wafer with a short inspection time.

In order to achieve the above object, the preferred embodiments of the present invention provide a microscope for inspecting a semiconductor wafer, comprising: an optical unit including objective lenses and oculars for observing the semiconductor wafer; a display unit for magnifying and displaying an image of the semiconductor wafer observed by the optical unit; a sample piece stage holding the semiconductor wafer; a stage moving unit for moving the semiconductor wafer in an x-axis direction, a y-axis direction and/or a z-axis direction; a stage rotation unit for rotating the semiconductor wafer in a horizontal direction; a stage tilting unit for tilting the semiconductor wafer; and a controller for controlling operation of the microscope.

The stage tilting unit includes a rotation shaft for rotatably supporting the sample piece stage and a motor for generating power to vertically rotate the rotation shaft. Beneficially, the motor of the stage tilting unit is a stepping motor. The sample piece stage includes at least one wafer detecting sensor for detecting whether the semiconductor wafer is laid on the sample piece stage or not. The sample piece stage includes at least two wafer stoppers at a radius distance of a round portion of the semiconductor wafer from a central pivot of the semiconductor wafer. The sample piece stage includes a flat zone detecting sensor for detecting a flat zone of the semiconductor wafer. The stage rotation unit includes a vacuum line, a vacuum chuck including a vacuum absorber for holding the semiconductor wafer using vacuum pressure, and a motor for generating power to rotate the vacuum chuck. Beneficially, the motor of the stage rotation unit is a DC motor.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to preferred embodiments of the present invention, examples of which is illustrated in the accompanying drawings.

Figure 1:
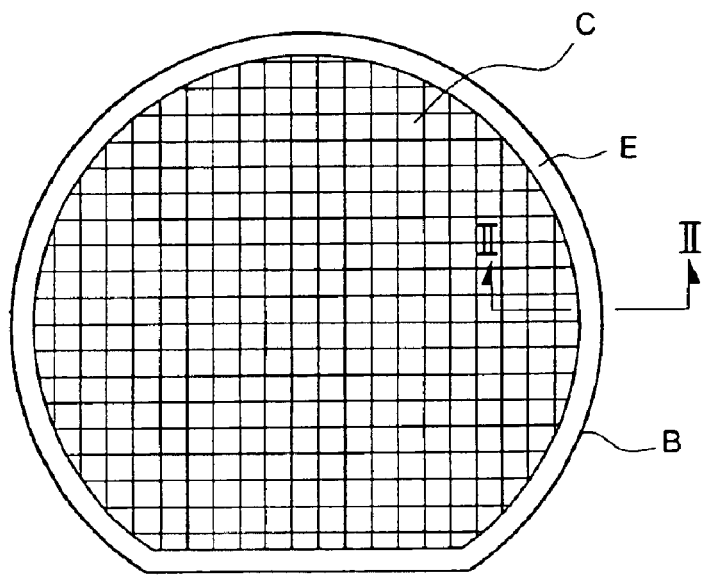
FIG. 1 is a plan view illustrating a typical semiconductor wafer.
Figure 2:
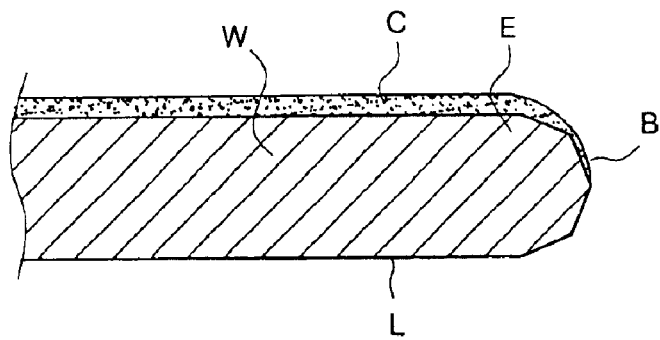
FIG. 2 is a cross-sectional view taken along line II—II of FIG. 1.
Figure 3:
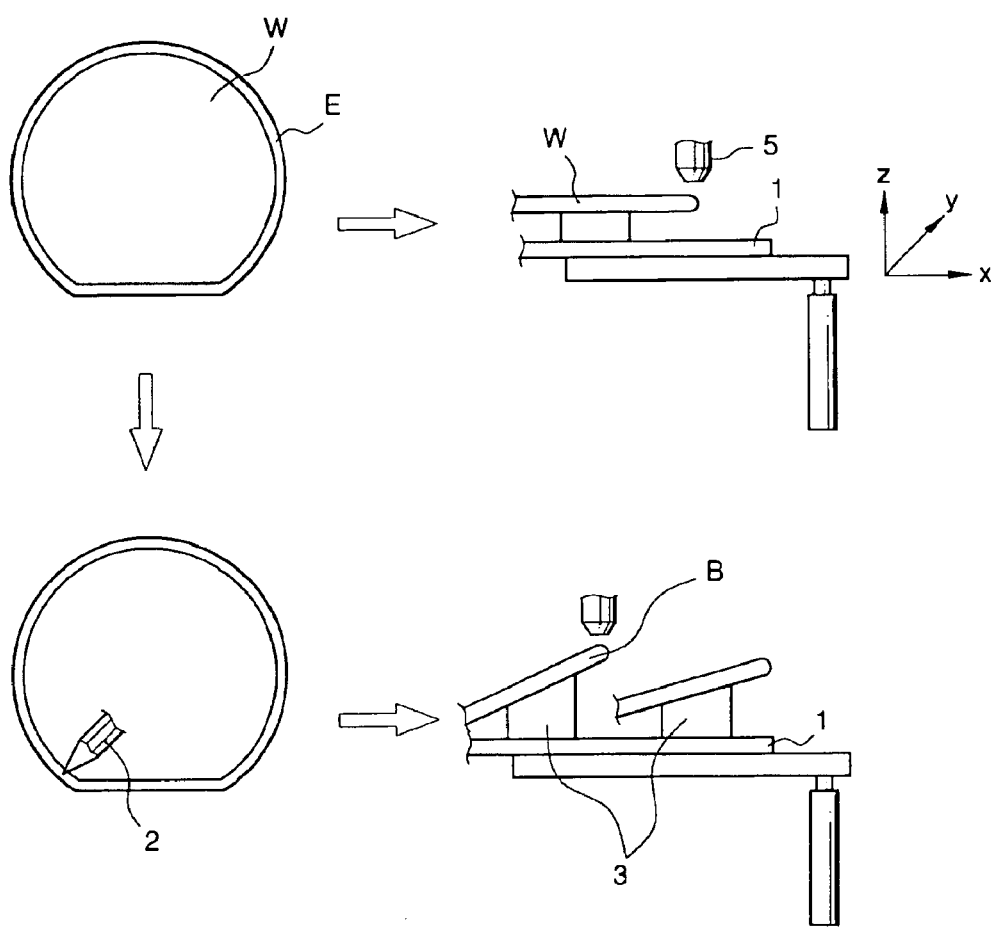
FIG. 3 shows a process of probing a semiconductor wafer using a conventional microscope.
Figure 4:
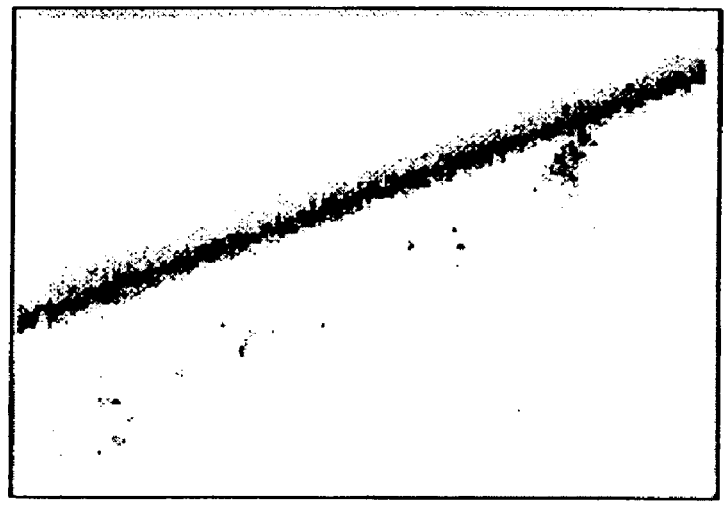
FIG. 4 is a photograph illustrating an edge portion of the semiconductor wafer.
Figure 5:
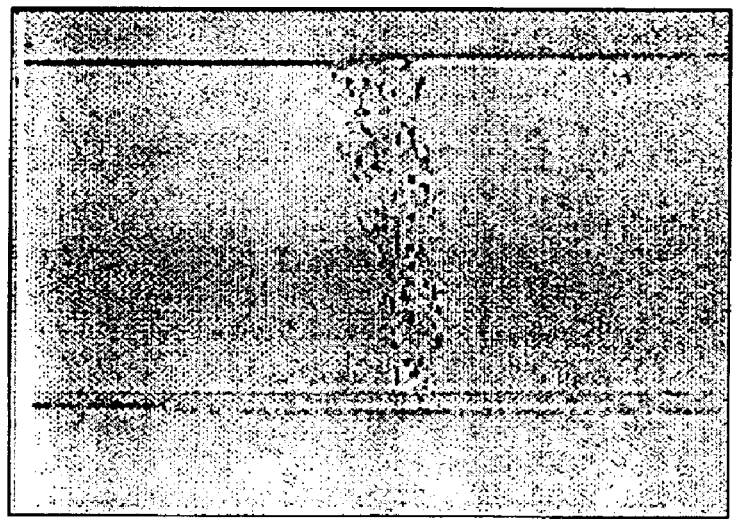
FIG. 5 is a photograph illustrating a bevel portion of the semiconductor wafer.
Figure 6:
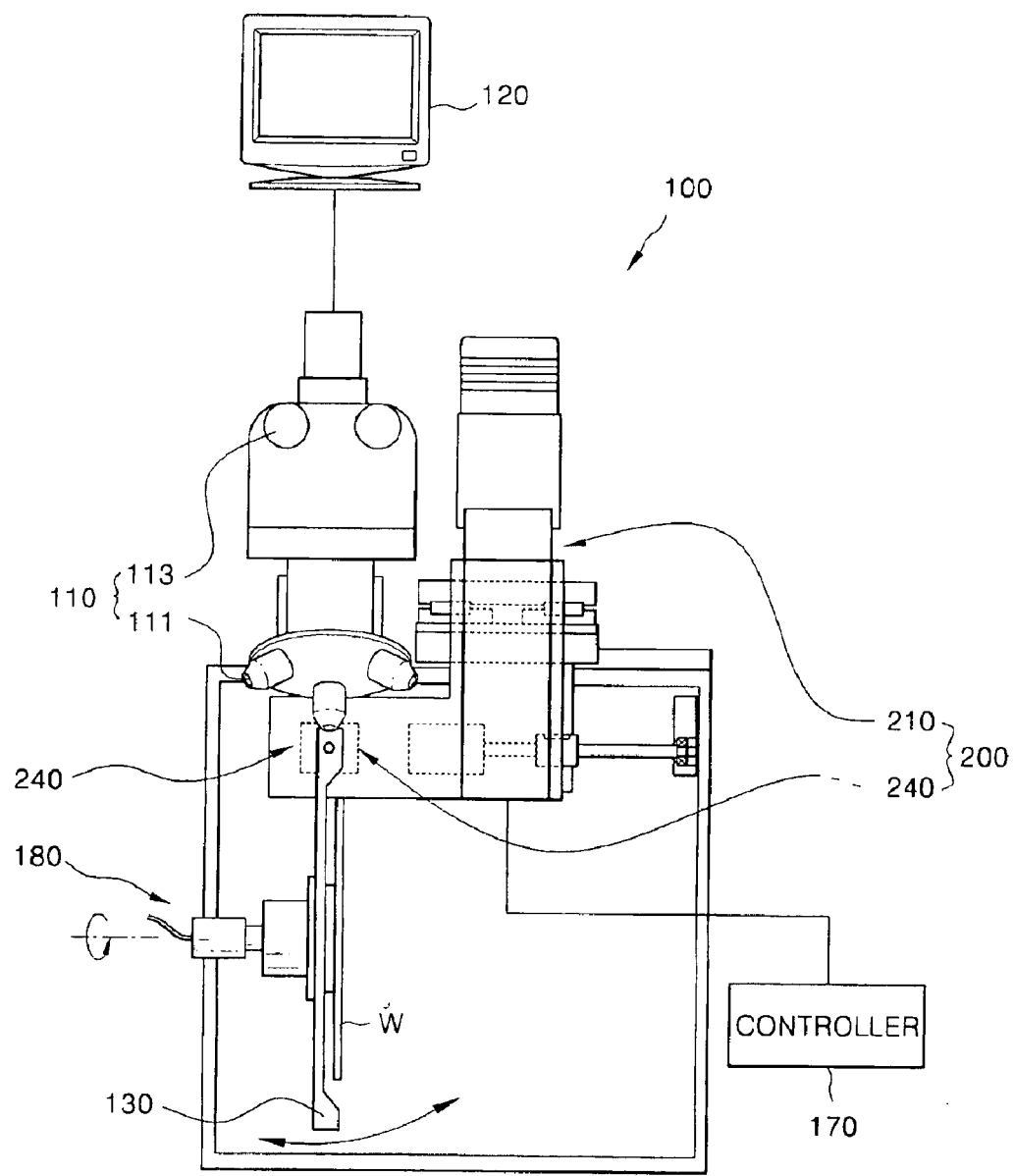
FIG. 6 is a schematic view illustrating a wafer inspecting system according to a preferred embodiment of the present invention.
Figure 7:
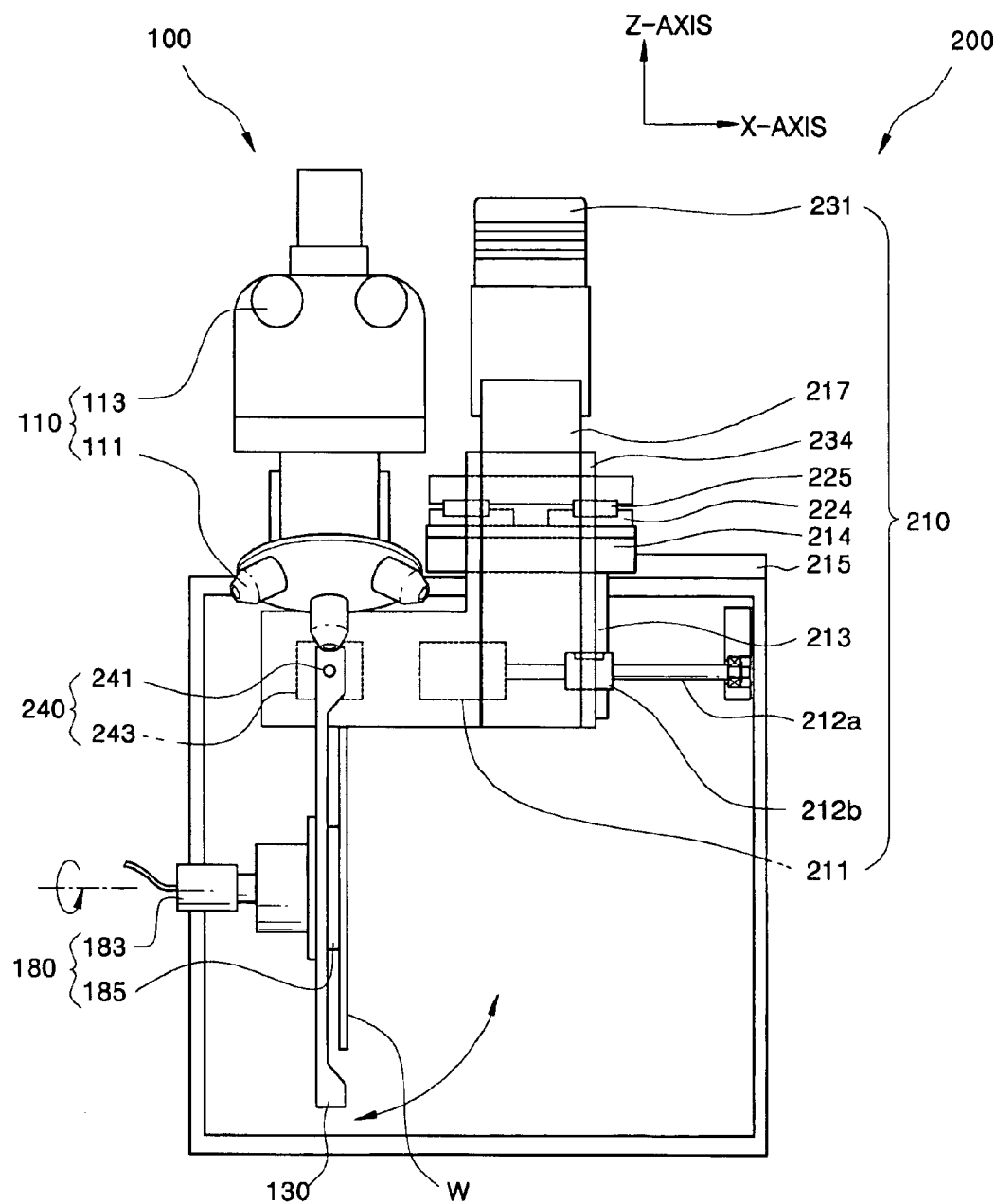
FIG. 7 is a front view illustrating a microscope according to a preferred embodiment of the present invention.

FIG. 6 is a schematic view illustrating a wafer probing system employing a microscope for probing a semiconductor wafer. FIG. 7 is a front view illustrating the microscope of FIG. 6, and FIG. 8 is a side view illustrating the microscope of FIG. 6.

The microscope 100 includes an optical unit 110, a display unit 120, a sample piece stage 130, a controller 170, a rotation unit 180, and a stage moving unit 200.

The optical unit 110 includes an objective lens 111 and an ocular 113, and is used to observe a wafer sample piece laid on the sample piece stage 130 through the objective lens 110 and the ocular 113. The display unit 120 magnifies and displays an image of the sample piece wafer observed by the optical unit 110. The rotation unit 180 rotates the sample piece wafer on the sample piece stage 130 to a horizontal direction. The stage moving unit 200 includes an axis direction moving unit 210 and a tilting unit 240. The axis direction moving unit 210 moves the sample piece stage 130 in an x-axis direction, a y-axis direction or a z-axis direction. The tilting unit 240 tilts the sample piece stage 130 to a desired tilt angle. That is, the tilting unit 240 rotates the sample piece stage 130 in a vertical direction. The controller 170 controls all components of the microscope 100.

Figure 8:
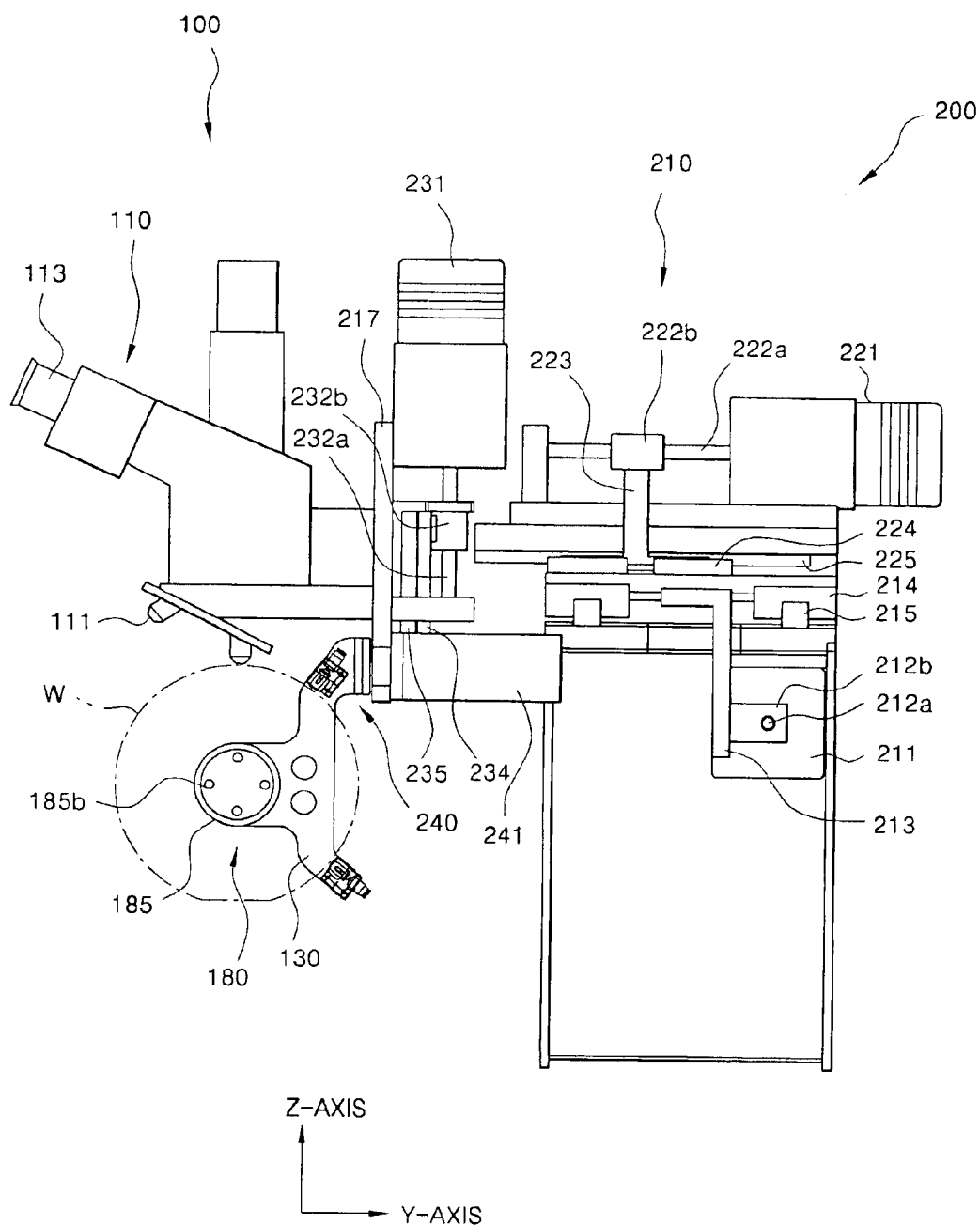
FIG. 8 is a side view illustrating the microscope according to a preferred embodiment of the present invention.

As shown in FIGS. 7 and 8, the axis direction moving unit 210 includes x-, y- and z-axis motors 211, 221 and 231, x-, y- and z-axis ball screw shafts 212a, 222a and 232a, x-, y- and z-axis moving nuts 212b, 222b and 232b, x-, y- and z-axis moving blocks 214, 224, 234, and x-, y- and z-axis linear motion guide 215, 225 and 235.

The x-, y- and z-axis motors 211, 221 and 231 generate power. The x-, y- and z-axis ball screw shafts 212a, 222a and 232a are rotated by the power generated from the x-, y- and z-axis motors 211, 221 and 231, respectively. The x-, y- and z-axis moving nuts 212b, 222b and 232b perform a linear motion. The x-, y- and z-axis moving blocks 214, 224 and 234 are coupled to the x-, y- and z-axis moving nuts 212b, 222b and 232b, respectively, through corresponding coupling brackets and perform a linear motion. In FIGS. 7 and 8, reference numerals 213 and 223 denote coupling brackets corresponding to the x- and y-axis moving nuts 212b and 222b, and a coupling bracket corresponding to the Z-moving nut 232b is not shown. The x-, y- and z-axis linear motion guides 215, 225 and 235 guide the linear motion of the x-, y- and z-axis moving blocks 214, 224 and 234, respectively. The axis direction moving unit 210 configured as described above moves the sample piece stage 130 in a horizontal direction or a vertical direction.

The sample piece stage 130 is coupled to the z-axis moving block 234. The z-axis moving block 234 has the shape of the letter "L" and places the sample piece stage 130 under the objective lens 111.

A reference numeral 217 denotes a coupling bracket coupled to the z-axis motor 231. The coupling bracket 217 is also coupled to the y-axis moving block 224 and thus performs a linear motion to move the sample piece stage 130 in an x-axis direction or a y-axis direction when the x-axis moving block 214 or the y-axis moving block 224 performs a linear motion. The coupling bracket 217 is structurally separated from the z-axis moving block 234 and thus does not move when the z-axis moving block 234 performs a linear motion.

Operation of the axis direction moving unit 210 is described below in greater detail.

When the x-axis motor 211 is driven to rotate the x-axis ball screw shaft 212a in order to move the sample piece stage 130 in an x-axis direction, the x-axis moving nut 212b coupled to an outer circumference of the x-axis ball screw shaft 212a performs a linear motion. The x-axis moving block 214 coupled to the x-axis moving nut 212b moves along the x-axis linear motion guide 215 forwardly or backwardly. The y-axis direction moving unit, i.e., the y-axis motor 221 and the y-axis moving block 224, arranged over the x-axis moving block 214 perform a forward movement or a backward movement together by a forward movement or a backward movement of the x-axis moving block 214. The z-axis moving unit, i.e., the z-axis motor 231 and the z-axis moving block 234, coupled to the y-axis moving block 224 through the coupling bracket 217 perform a forward movement or a backward movement together with the y-axis moving block 224. As a result, the sample piece stage 130 coupled to the z-axis moving block 234 moves in an x-axis direction. In the drawings, a coupling state of the y-axis moving block 234 is not shown.

Meanwhile, in order to move the sample piece stage 130 in a y-axis direction, the coupling bracket 217 coupled to the y-axis moving block 224 moves forwardly or backwardly in a y-axis direction on the same principle as described above. Therefore, the z-axis motor 231 and the z-axis moving block 234 coupled to the coupling bracket 217 move in a y-axis direction. As a result, the sample piece stage 130 coupled to the z-axis moving block 234 moves in a y-axis direction. At this time, since the y-axis moving block 224 is configured to slide in a state that it is laid on the z-axis moving block 234, the y-axis moving block 224 does not affect any x-axis direction movement at all.

Also, when the z-axis motor 231 is driven to rotate the z-axis ball screw shaft 232a in order to move the sample piece stage 130 in a z-axis direction, the z-axis moving nut 232b moves up or down. The z-axis moving block 234 coupled to the z-axis moving nut 232b moves up or down. As a result, the sample piece stage 130 coupled to the z-axis moving block 234 moves in a z-axis direction. At this point, a sensor (not shown) is arranged on the z-axis linear motion guide 235 to control a z-axis direction movement distance in order to prevent the semiconductor wafer from contacting the objective lens 111 during a z-axis direction movement. The z-axis moving block 234 does not affect any x-axis direction movement or y-axis direction movement at all.

Figure 9:
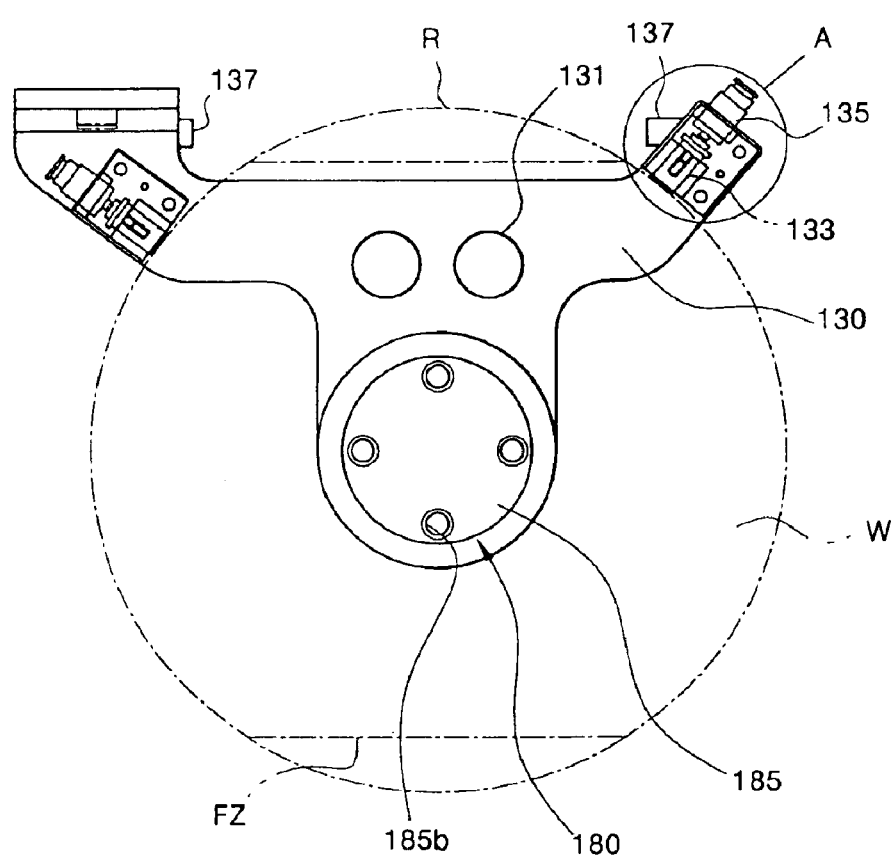
FIG. 9 is a top view illustrating a sample piece stage according to a preferred embodiment of the present invention.
Figure 10:
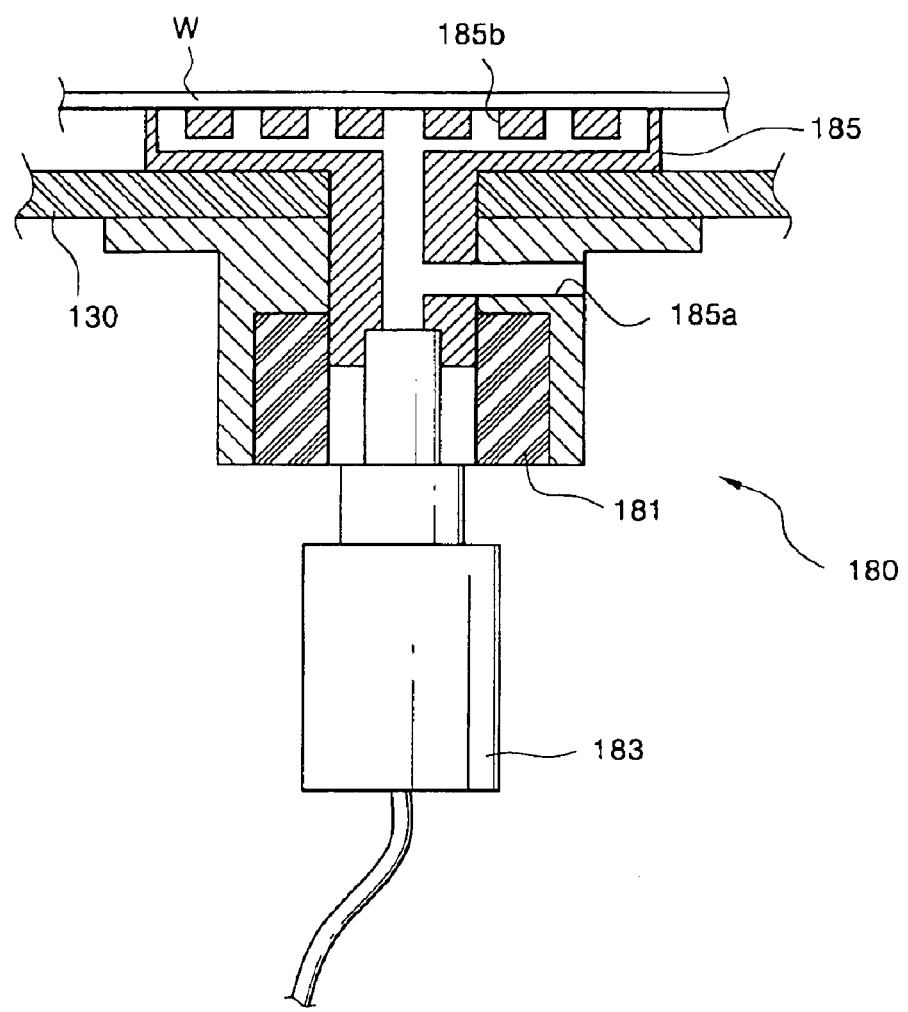
FIG. 10 is a cross-sectional view illustrating a rotation unit according to a preferred embodiment of the present invention.

The rotation unit 180 includes a vacuum chuck 185 as shown in FIGS. 9 and 10. The vacuum chuck 185 includes a vacuum line 185a and a vacuum absorber 185b, and holds the semiconductor wafer W using vacuum pressure. The vacuum chuck 185 is arranged on a base of the sample piece stage 130 and is coupled to a motor 183 through a coupling member 181. The vacuum chuck 185 horizontally rotates a semiconductor wafer W by power generated from the motor 183. Preferably, a DC motor is used as the motor 183.

Figure 11:
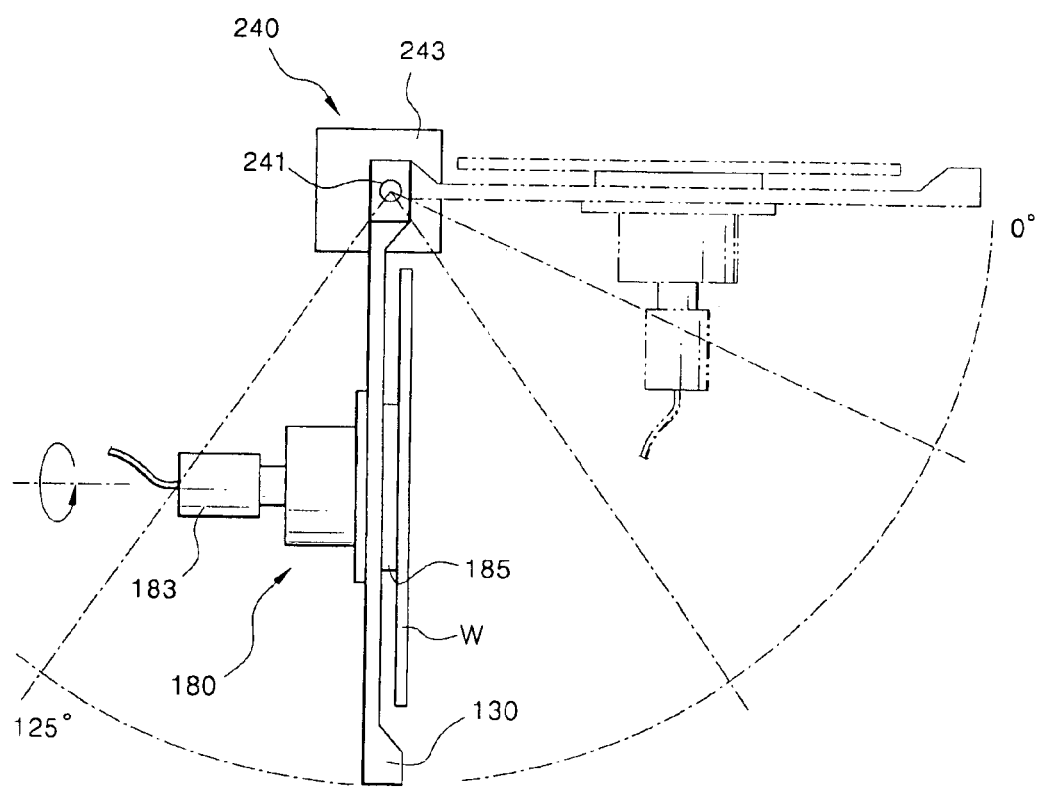
FIG. 11 shows operation of a tilting unit according to the preferred embodiment of a present invention.

The tilting unit 240 includes a rotation shaft 241 and a motor 243 as shown in FIGS. 7 and 11. The rotation shaft 241 rotatably supports the sample piece stage 130. The motor 243 produces a power to vertically rotate the rotation shaft 241. Preferably, a stepping motor is used as the motor 243. The tilting unit 240 can vertically rotate the sample piece stage 130 from 0° to 180°, wherein a vertically rotated angle (i.e., tilt angle) is determined by a user manually or automatically.

By employing the tilting unit 240, wafer holding jigs are not required and thus a wafer inspecting process becomes simplified, thereby reducing a wafer inspection time. Also, it becomes possible to inspect a bevel portion of the semiconductor wafer as well as an edge portion of the semiconductor wafer W.

Figure 12:
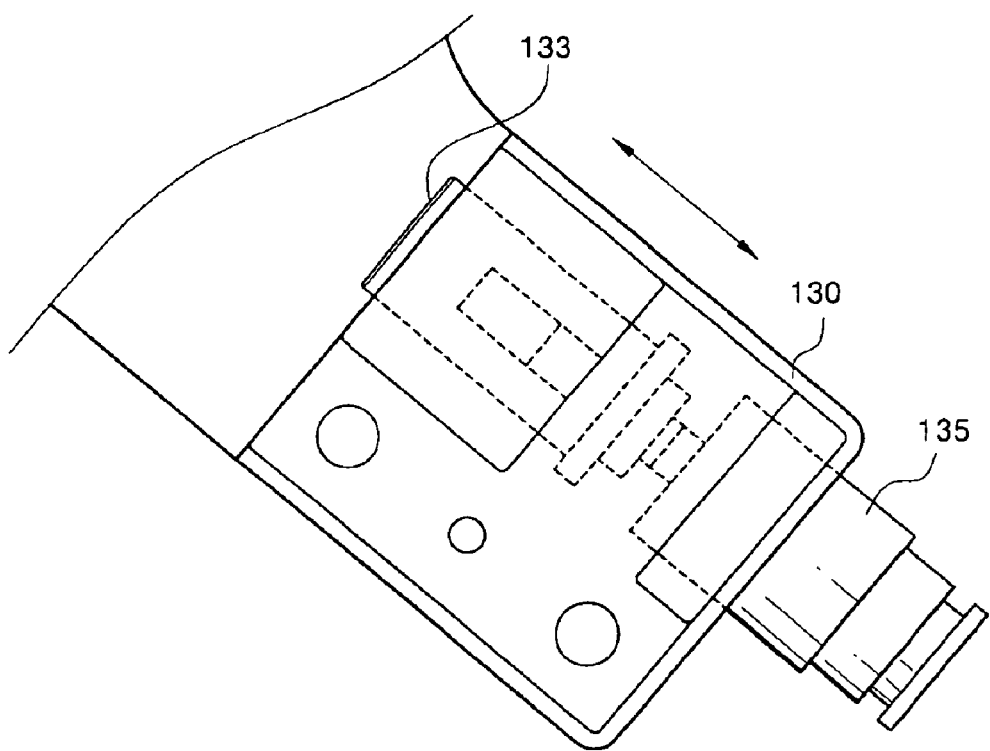
FIG. 12 is an enlarged view illustrating a portion A of FIG. 9.

As shown in FIGS. 8, 9 and 12, the sample piece stage 130 includes at least one wafer detecting sensor 131 and at least two wafer stoppers 133. The wafer detecting sensor 131 senses whether the semiconductor wafer W is placed on the sample piece stage 130 or not. The two wafer stoppers 133 are located at a radius distance of the round portion R of the semiconductor wafer W from the central pivot of the vacuum chuck 185. Therefore, when the semiconductor wafer W is placed on the sample piece stage 130 to contact the two wafer stoppers 133, a center of the semiconductor wafer is properly laid on with a central pivot of the vacuum chuck 185. The wafer stoppers 133 are configured to move forwardly or backwardly by operation of corresponding air cylinders 135. When the semiconductor wafer is properly aligned with the vacuum chuck 185, the wafer stopper keys 133 move backwardly by operation of the air cylinder 135 in order not to prevent the bevel portion of the semiconductor wafer from being inspected. That is, the alignment key 133 is disengaged from contacting the bevel portion of the semiconductor wafer W by operation of the air cylinder 135.

Since the semiconductor wafer W is properly aligned with the sample piece stage 130 by the wafer stoppers 133, it is possible to rotate or tilt the sample piece stage 130 without any damage of the microscope 100. For example, when a center of the semiconductor wafer W is not properly aligned with a central pivot of the vacuum chuck 185, a working distance between the objective lens 111 and the semiconductor wafer W which depends on a magnifying power of the objective lens 111 is not secured, whereupon the objective lens 111 can be damaged during a horizontal rotation operation or a tilting operation. In addition, it becomes difficult to focus the objective lens on the semiconductor wafer W, thereby increasing the focusing time.

Meanwhile, the wafer detecting sensor 131 can have a function to detect whether the semiconductor wafer W is properly aligned with the vacuum chuck 185 or not. Otherwise, a sensor detecting an alignment state of the semiconductor wafer W can additionally be arranged.

As shown in FIG. 9, a flat zone detecting sensor 137 is arranged at a predetermined location of the sample piece stage 130 to detect a flat zone FZ of the semiconductor wafer W. Preferably, a photo sensor including a light emitting portion and a light absorbing portion is used as a flat zone detecting sensor 137.

The photo sensor 137 detects the flat zone of the semiconductor wafer as follows: when a round portion R of the semiconductor wafer W is positioned between the light emitting portion and the light absorbing portion of the photo sensor 137, light emitted from the light emitting portion cannot arrive at the light absorbing portion. However, when a flat zone FZ of the semiconductor wafer W is properly positioned between the light emitting portion and the light absorbing portion of the photo sensor 137 since light emitted from the light emitting portion can arrive at the light absorbing portion, it is possible to detect the flat zone FZ of the semiconductor wafer W.

The round portion R of the semiconductor wafer W is inspected while rotating the semiconductor wafer W. Thereafter, the flat zone FZ of the semiconductor is inspected. In this case, the objective lens 111 is not focused on the flat zone FZ of the semiconductor wafer W, because the flat zone and the rounding portion of the semiconductor wafer differ in radius. Therefore, a radius difference between the round portion R and the flat zone FZ has to be compensated.

When the flat zone FZ of the semiconductor wafer W is detected by the flat zone detecting sensor 137, the flat zone detecting sensor 137 outputs a signal to a microprocessor or a programmable logic controller (PLC) to move the z-axis moving unit (i.e., z-axis motor and z-axis moving block) by as much as an initially set value, i.e., a radius difference between the round portion R and the flat zone FZ. As a result, the sample piece stage 130 is moved up by the z-axis moving unit, and the objective lens 111 is focused on the sample piece stage 130. Also, in order to inspect the remainder portions of the flat zone FZ that are not inspected yet, the sample piece stage 130 moves in a y-axis direction.

Figure 13:
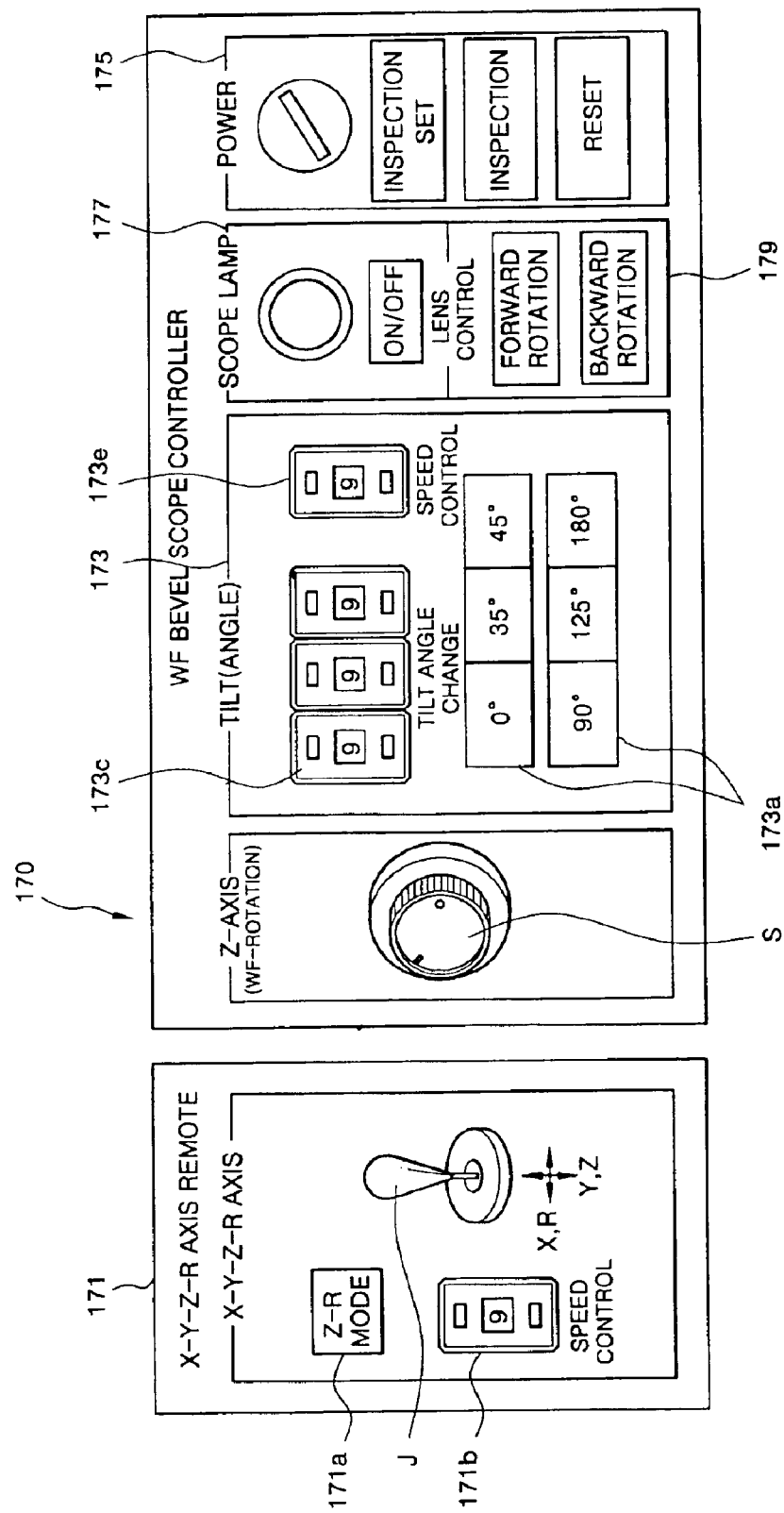
FIG. 13 is a top view illustrating a controller according to a preferred embodiment of the present invention.

FIG. 13 shows the controller 170. The controller 170 includes a movement mode selecting portion 171, a tilt angle selecting portion 173, a power selecting portion 175, a scope lamp on/off selecting portion 177, and a lens rotating portion 179.

The movement mode selecting portion 171 is used to select an X-axis direction movement, a Y-axis direction movement, a Z-axis direction movement, or a horizontal rotation of the semiconductor wafer W. A joystick "J" is used to select a movement mode such as an X-axis direction movement, a Y-axis direction movement, a Z-axis direction movement, and a horizontal rotation of the semiconductor wafer W.

A movement mode changing switch 171 a is used to change the movement mode from an x-axis direction movement to a horizontal rotation or from a y-axis direction movement to a z-axis direction movement. A movement speed changing button 171b is used to control a movement speed of the semiconductor wafer W.

The tilt angle selecting portion 173 is used to select a tilt angle condition of the sample piece stage 130. The tilt angle selecting portion 173 includes a plurality of tilt angle selection buttons 173a, each corresponding to a different predetermined tilt angle, and a user tilt angle entry button 173c. A user can select a desired tilt angle by selecting a predetermined tilt angle with the tilt angle selection buttons 173a, or by entering a specific desired tilt angle with the user tilt angle entry button 173c. The tilt angle selection portion 173 further includes a speed control button 173e to control a tilting operation speed. The tilt angle selecting button 173a of FIG. 13 includes six (6) tilting angle buttons having tilt angles 0°, 35°, 45°, 90°, 125°, 180°, and therefore, the entire portion of the semiconductor wafer W including an edge portion, a bevel portion and a bottom portion can be inspected. For example, when the sample piece stage 130 is at a tilt angle 0°, the surface and the edge portion of the semiconductor wafer W can be inspected. When the sample piece stage 130 is tilted at a tilt angle 180°, the bottom portion of the semiconductor wafer W can be inspected.

The power selecting portion 175 is used to turn on or off the microscope 100. The lens rotating portion 179 is used to rotate the objective lens to a predetermined direction.

The microscope as described above has one or more of the following advantages. Firstly, since the sample piece stage performs rotation and tilting operations as well as a horizontal shift and a vertical shift, it is possible to simultaneously inspect the edge portion and the bevel portion of the semiconductor wafer, thereby reducing the wafer inspection time. Also, no wafer holding jigs each having a different tilt angle are required. Further, other contaminations due to handling of a wafer sample piece, such as a conveying and cutting the defective semiconductor wafer do not occur, whereupon inspection data can have reliability. Moreover, since regular monitoring is performed during a process of manufacturing the semiconductor wafer, it is possible to find and prevent defects in advance. Finally, it is possible to precisely inspect the semiconductor wafer having defects in the edge portion and the bevel portion and to clearly analyze or clarify defect factors, and also the inspection time is short, whereby an appropriate remedy can be performed, leading to a high manufacturing yield.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A microscope for inspecting a semiconductor wafer, comprising:
    an optical unit including objective lenses and oculars for observing the semiconductor wafer;
    a display unit for magnifying and displaying an image of the semiconductor wafer observed by the optical unit;
    a sample piece stage holding the semiconductor wafer and including at least two wafer stoppers at a radius distance of a round portion of the semiconductor wafer from a central pivot of the semiconductor wafer;
    a stage moving unit for moving the semiconductor wafer in an x-axis direction, a y-axis direction and/or a z-axis direction;
    a stage rotation unit for rotating the semiconductor wafer in a horizontal direction;
    a stage tilting unit for rotating an end of the sample piece stage to tilt the semiconductor wafer from 0° to 180°, wherein the stage tilting unit is displaceable in an x-y-z direction by the stage moving unit; and
    a controller for controlling operation of the microscope.

2. The microscope of claim 1, wherein the stage tilting unit includes:
    a rotation shaft for pivotally supporting the end of the sample piece stage; and
    a motor for generating a power to vertically rotate the rotation shaft.

3. The microscope of claim 2, wherein the motor of the stage tilting unit is a stepping motor.

4. The microscope of claim 1, wherein the sample piece stage includes at least one wafer detecting sensor for detecting whether the semiconductor wafer is laid on the sample piece stage.

5. The microscope of claim 1, wherein the sample piece stage includes a flat zone detecting sensor for detecting a flat zone of the semiconductor wafer.

6. The microscope of claim 1, wherein the stage rotation unit includes a vacuum line, a vacuum chuck including a vacuum absorber for holding the semiconductor wafer using a vacuum pressure, and a motor for generating a power to rotate the vacuum chuck.

7. The microscope of claim 6, wherein the motor of the stage rotation unit is a DC motor.

8. The microscope of claim 1, further comprising at least two air cylinders each configured to move a corresponding one of the wafer stoppers forward and backward.

9. An inspection station for a semiconductor wafer, comprising:
    a platform for holding the semiconductor wafer thereon;
    at least one wafer stopper at a radius distance of a round portion of the semiconductor wafer from a central pivot point of the semiconductor wafer for aligning the semiconductor wafer on the platform;
    rotating means for rotating the semiconductor wafer to a desired tilt angle;
    a controller for adjusting the tilt angle of the semiconductor wafer; and
    an optical unit for viewing an image of at least a portion of the semiconductor wafer to perform an inspection thereof.

10. The inspection station of claim 9, further comprising a display unit for displaying the image of the portion of the semiconductor wafer.

11. The inspection station of claim 9, further comprising a platform moving unit for moving the platform along at least two axes.

12. The inspection station of claim 9, wherein the rotating means further comprises:

a vacuum chuck for holding the semiconductor wafer on the platform; and a motor for supplying power to the vacuum chuck.

13. The inspection station of claim 12, wherein the motor is a stepping motor.

14. The inspection station of claim 9, wherein the platform includes at least one wafer detecting sensor for detecting whether the semiconductor wafer is laid on the platform.

15. The inspection station of claim 9, wherein the controller includes means for selecting the desired tilt angle of the semiconductor wafer.

16. The inspection station of claim 9, wherein the controller includes means for controlling a speed at which the tilt angle of the semiconductor wafer is changed.

17. The inspection station of claim 9, further comprising an air cylinder configured to move the wafer stopper forward and backward.

18. The inspection station of claim 9, further comprising a second wafer stopper at a radius distance of the round portion of the semiconductor wafer from the central pivot point of the semiconductor wafer for aligning the semiconductor wafer on the platform.

19. An inspection station for a semiconductor wafer, comprising:

a stage for holding the semiconductor wafer thereon;

at least one wafer stopper at a radius distance of a round portion of the semiconductor wafer from a central pivot point of the semiconductor wafer;

stage moving means for moving the semiconductor wafer in an x-axis direction, a y-axis direction, and a z-axis direction;

rotating means for rotating the semiconductor wafer to a desired tilt angle;

a controller for adjusting the tilt angle of the semiconductor wafer; and an optical unit for viewing an image of at least a portion of the semiconductor wafer to perform an inspection thereof.

20. The inspection station of claim 19, further comprising at least two wafer stoppers adapted to align the semiconductor wafer on the stage.

21. The inspection station of claim 19, comprising a second wafer stopper at a radius distance of the round portion of the semiconductor wafer from the central pivot point of the semiconductor wafer.

* * * * *